US011350106B2

(12) United States Patent
Philippe et al.

(10) Patent No.: US 11,350,106 B2
(45) Date of Patent: May 31, 2022

(54) METHOD FOR ENCODING AND DECODING IMAGES, DEVICE FOR ENCODING AND DECODING IMAGES AND CORRESPONDING COMPUTER PROGRAMS

(71) Applicant: Orange, Issy-les-Moulineaux (FR)

(72) Inventors: Pierrick Philippe, Melesse (FR); Hendrik Vorwerk, Munster (DE)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/799,149

(22) Filed: Feb. 24, 2020

(65) Prior Publication Data
US 2020/0195933 A1    Jun. 18, 2020

Related U.S. Application Data

(63) Continuation of application No. 15/100,550, filed as application No. PCT/FR2014/053069 on Nov. 27, 2014, now Pat. No. 10,616,586.

(30) Foreign Application Priority Data

Nov. 29, 2013 (FR) ...................................... 1361822

(51) Int. Cl.
*H04N 19/88* (2014.01)
*H04N 19/147* (2014.01)
(Continued)

(52) U.S. Cl.
CPC ........... *H04N 19/147* (2014.11); *H04N 19/12* (2014.11); *H04N 19/126* (2014.11);
(Continued)

(58) Field of Classification Search
CPC ...... H04N 19/147; H04N 19/12; H04N 19/88; H04N 19/126; H04N 19/176; H04N 19/45
See application file for complete search history.

(56) References Cited

U.S. PATENT DOCUMENTS

2004/0047512 A1* 3/2004 Handley ................ H04N 19/60
                                                382/250
2006/0018477 A1    1/2006 Jalfon et al.
(Continued)

FOREIGN PATENT DOCUMENTS

FR           2899744 A1    10/2007

OTHER PUBLICATIONS

International Search Report dated Jan. 14, 2015 for corresponding International Application No. PCT/FR2014/053069, filed Nov. 27, 2014.
(Continued)

*Primary Examiner* — Dave Czekaj
*Assistant Examiner* — Berteau Joisil
(74) *Attorney, Agent, or Firm* — David D. Brush; Westman, Champlin & Koehler, P.A.

(57) ABSTRACT

A method for decoding a data signal representative of at least one image cut into blocks. The method includes, for a current block to be decoded: transforming a residual data block obtained from the data signal; determining a permutation-transformation pair including a transformation mathematical operation and a permutation mathematical operation, the transformation mathematical operation and the permutation mathematical operation belonging to respectively a plurality of permutation operations and a plurality of transformation operations; applying the determined transformation mathematical operation to the data of the residual data block to produce transformed data; applying the determined permutation mathematical operation to the transformed data to produce permuted data, the determined permutation mathematical operation being an operation of transposing the transformed data; and using the permuted data to reconstruct the current block by a predictive decoding.

10 Claims, 8 Drawing Sheets

(51) Int. Cl.
*H04N 19/12* (2014.01)
*H04N 19/126* (2014.01)
*H04N 19/176* (2014.01)
*H04N 19/44* (2014.01)

(52) U.S. Cl.
CPC ........... *H04N 19/176* (2014.11); *H04N 19/45* (2014.11); *H04N 19/88* (2014.11)

(56) References Cited

U.S. PATENT DOCUMENTS

2007/0177672 A1* 8/2007 Yang .................... H04N 19/197
375/240.25
2013/0343448 A1* 12/2013 He ....................... H04N 19/122
375/240.03

OTHER PUBLICATIONS

Ichigaya A. et al., "CE7.5: Performance Analysis of Adaptive DCT/DST Selection", 6. JCT-VC Meeting; 97. MPEG Meeting Jul. 14, 2011-Jul. 22, 2011; Torino; (Joint Collaborative Team on Video Coding of ISO/IEC JTC1/SC29/WG11 and ITU-T SG. 16); URL: Http://wftp3.itu.intiav-arch/jctvc-site/,, No. JCTVC-F229, Jul. 1, 2011 (Jul. 1, 2011), XP030009252.
English translation of the Written Opinion dated Jan. 14, 2015 for corresponding International Application No. PCT/FR2014/053069, filed Nov. 27, 2014.
"ITU-T Recommendation H.265 / Standard ISO/IEC 23008-2". (Apr. 2013).
Reznic, "Relationship between DCT-II, DCT-VI, and DST-VII transforms", ICASSP 2013.
Restriction Requirement dated Dec. 1, 2017 for corresponding U.S. Appl. No. 15/100,550, filed May 31, 2016.
Office Action dated May 14, 2018 for corresponding U.S. Appl. No. 15/100,550, filed May 31, 2016.
Final Office Action dated Dec. 14, 2018 for corresponding U.S. Appl. No. 15/100,550, filed May 31, 2016.
Advisory Action dated Mar. 27, 2019 for corresponding U.S. Appl. No. 15/100,550, filed May 31, 2016.
Office Action dated May 20, 2019 for corresponding U.S. Appl. No. 15/100,550, filed May 31, 2016.
Notice of Allowance dated Nov. 27, 2019 for corresponding U.S. Appl. No. 15/100,550, filed May 31, 2016.
Schafer, Ralf et al., "The Emerging H.264/AVC Standard", Audio/Video Coding, EBU Technical Review—Jan. 2003, 12 pages.

* cited by examiner

Fig. 3B

METHOD FOR ENCODING AND DECODING IMAGES, DEVICE FOR ENCODING AND DECODING IMAGES AND CORRESPONDING COMPUTER PROGRAMS

CROSS-REFERENCE TO RELATED APPLICATIONS

This Application is a continuation of U.S. application Ser. No. 15/100,550, filed May 31, 2016, which is a Section 371 National Stage Application of International Application No. PCT/FR2014/053069, filed Nov. 27, 2014, and published as WO 2015/079179 on Jun. 4, 2015, not in English, the contents of which are incorporated herein by reference in their entireties.

FIELD OF THE INVENTION

The present invention generally relates to the field of image processing, and more precisely to the encoding and decoding of digital images and digital image sequences.

The encoding/decoding of digital images applies notably to images from at least one video sequence including:

images from the same camera and succeeding each other in time (2D encoding/decoding), images from different cameras oriented along different views (3D encoding/decoding), corresponding components of texture and depth (3D encoding/decoding), etc.

The present invention applies in a similar manner to the encoding/decoding of 2D or 3D images.

The invention may notably, but not exclusively, apply to video encoding implemented in current AVC and HEVC video encoders and their extensions (MVC, 3D-AVC, MV-HEVC, 3D-HEVC, etc), and to the corresponding decoding.

PRIOR ART

Current video encoders (MPEG, H.264, HEVC, etc.) use a representation of the video sequence by blocks. The images are cut into blocks, which may be recursively cut up again. Then each block is encoded by intra-image or inter-image prediction. Thus, some images are encoded by spatial prediction (intra prediction), other images are also encoded by temporal prediction (inter prediction) with respect to one or more encoded-decoded reference images, with the aid of a motion compensation known to the person skilled in the art.

A residual block is encoded for each block, also referred to as prediction residue, corresponding to the original block minus a prediction. The residual blocks are transformed with the aid of a mathematical operation of transformation, then quantized with the aid of a mathematical operation of quantization e.g. of the scalar type. Coefficients are obtained at the end of the quantization step. They are then scanned in a reading order which depends on the mode of encoding that has been chosen. In the HEVC standard, for example, the reading order is dependent on the prediction made and may be performed in "horizontal", "vertical" or "diagonal" order.

At the end of the aforementioned scan, a one-dimensional list of coefficients is obtained. The coefficients of this list are then encoded in the form of bits by an entropy encoding the purpose of which is to losslessly encode the coefficients.

With regard to the aforementioned mathematical operation of transformation, block transformations are the most used since they meet three important criteria:

these are block transformations, thus it is easy to manipulate the blocks independently of each other, they are effective for compacting the information in the frequency domain, where the operation of rate reduction operates, they are implemented with the aid of fast algorithms ensuring a limited algorithmic complexity.

In the field of video encoding, discrete cosine transforms, DCT (in the English abbreviation), or discrete sine transforms, DST (in the English abbreviation), are preferred for their speed of execution. In particular, they are implemented in a way that is separable into few operations and have implementations well suited to processing on a fixed point processor.

The bits obtained after entropy encoding are included in a signal or data stream that is intended to be transmitted to the decoder.

In a way known per se, such a signal includes:

the quantized coefficients contained in the aforementioned list, information representative of the mode of encoding used, in particular:

the mode of prediction (intra prediction, inter prediction, default prediction making a prediction for which no information is transmitted to the decoder ("skip");

information specifying the type of prediction (orientation, reference image, etc.);

the type of block cutting;

the type of transform, e.g. DCT 4×4, DCT 8×8, etc.

the motion information if necessary;

etc.

Once the stream has been received by the decoder, the decoding is done image by image, and for each image, block by block. For each block, the corresponding elements of the stream are read. Inverse quantization and inverse transformation of the coefficients of the blocks are performed for producing the decoded prediction residue. Then, the prediction of the block is calculated and the block is reconstructed by adding the prediction to the decoded prediction residue.

The conventional encoding/decoding technique that has just been described certainly makes improvements in encoding performance possible. According to the video context, it notably makes possible:

an improvement in the quality of the images for a given network rate used for transmitting the images, a reduction in the image transmission rate for a previously set image quality criterion.

However, such encoding performances are not currently optimized and should be further improved, in particular from the point of view of minimizing the rate/distortion cost or the choice of the best effectiveness/complexity compromise, which are criteria well-known to the person skilled in the art.

SUMMARY OF THE INVENTION

An aspect of the present disclosure concerns a method for encoding at least one image cut into blocks.

The method of encoding according to the invention is characterized in that for a current block to be encoded, it implements the following steps:

predicting the current block with the aid of at least one predictor block, determining a residual data block representative of the difference between the predictor block and the current block, selecting, according to a predetermined criterion, a pair of mathematical operations including a permutation operation and a transformation operation from among a plurality of permutation operations and a plurality of transformation operations, applying the permutation operation of the selected pair to the data of the determined residual block, applying the transformation operation of the selected pair to the permuted data, encoding the data from the applied transformation operation.

Such an arrangement has the advantage of significantly improving the compression performance of the data signal to be transmitted to the decoder, through a better choice of the effectiveness/complexity compromise. In other words, the encoding performance is better than that obtained in the prior art through both a simplicity of implementation of the encoding steps and a limited complexity in the decoding.

According to one particular embodiment, the plurality of transformation operations contains a discrete sine transform.

The choice of a DST transform advantageously makes it possible to optimize the encoding performance, but also to reduce the calculation resources.

According to a first variant, the choice of a DST transform from among the plurality of transformation operations available is imposed in the encoding, which simplifies the step of selecting a transform.

According to a second variant, the plurality of transformation operations contains a single transformation operation which is a DST transform. This second variant has the advantage that the encoder is not necessarily obliged to transmit the index associated with the DST transform to the decoder, in the case, of course, where this index is already available to the decoder. Accordingly, the cost of signaling encoding information is thereby effectively reduced.

According to another particular embodiment, the predetermined criterion is the minimization of the rate-distortion cost of the current block to be encoded.

The choice of such a criterion optimizes the selection of the permutation-transform pair.

According to another particular embodiment, the permutation operation selected consists in gradually moving the data of the determined residual block, in accordance with an operation of transposing the data of said residual block.

This type of permutation has the advantage of being particularly simple from a calculating point of view.

The various aforementioned embodiments or features may be added independently or in combination with each other, to the steps of the method of encoding as defined above.

The invention also concerns a device for encoding at least one image cut into blocks.

Such an encoding device is characterized in that it includes, for a current block to be encoded:

a module for predicting the current block with the aid of at least one predictor block, a module for determining a residual data block representative of the difference between the predictor block and the current block, a module for selecting, according to a predetermined criterion, a pair of mathematical operations including a permutation operation and a transformation operation from among a plurality of permutation operations and a plurality of transformation operations, a permutation module for applying the permutation operation of the selected pair to the data of the determined residual block, a transformation module for applying the transformation operation of the selected pair to the permuted data, an encoding module for encoding the data delivered by the transformation module.

Such an encoding device is notably capable of implementing the aforementioned method of encoding.

The invention also concerns a method for decoding a data signal representative of at least one image cut into blocks.

Such a method of decoding is characterized in that it includes, for a current block to be decoded, the steps of:

determining, in the data signal, data representative of a current residual block associated with the current block to be decoded, determining at least one predictor block of the current block to be decoded, determining a pair of mathematical operations including a transformation operation and a permutation operation, applying the transformation operation of the determined pair of operations to the data representative of a current residual block, applying the permutation operation of the determined pair to the data obtained as a result of applying the transformation operation, reconstructing the current block with the aid of the determined predictor block and the data from the permutation operation applied.

According to one particular embodiment, the step of determining the pair of mathematical operations implements the following steps:

reading, in the data signal, information representative of the pair of permutation and transformation operations selected in the encoding of the current block to be decoded, determining the inverse permutation and transformation operations of the permutation and transformation operations of the pair associated with the information read.

Such an embodiment is implemented when the quantity of data signaling the pair of permutation and transformation operations transmitted is reduced, which has the result of not allowing the decoder itself to retrieve the pair of permutation and transformation operations that has been selected in the encoding.

According to another particular embodiment, the step of determining the pair of mathematical operations consists in:

applying to the data representative of the current residual block a plurality of pairs of mathematical operations including a transformation operation followed by a permutation operation, the transformation and permutation operations being chosen from among a predetermined plurality of transformation operations and a predetermined plurality of permutation operations, reconstructing a plurality of blocks from the plurality of pairs applied, selecting a reconstructed block from among the plurality of reconstructed blocks, by maximizing a criterion of coherence applied to the plurality of reconstructed blocks.

Another such embodiment is implemented when the decoder is itself capable of retrieving the pair of permutation and transformation operations that has been selected in the encoding.

This other embodiment allows a greater reduction in the cost of signaling than that obtained in the preceding embodiment, since the index of the permutation operation and/or the index of the transformation operation which have been selected in the encoding are not necessarily transmitted in the data signal received at the decoder.

According to another particular embodiment, the determined or selected transformation operation is a discrete sine transform.

According to another particular embodiment, the permutation operation of the determined pair of operations consists in gradually moving the data obtained as a result of applying the transformation operation of the determined pair, in accordance with an operation of transposing these data.

The various aforementioned embodiments or features may be added independently or in combination with each other, to the steps of the method of decoding as defined above.

Correspondingly, the invention also concerns a device for decoding a data signal representative of at least one image cut into blocks.

Such a decoding device is characterized in that it includes, for a current block to be decoded:

a module for determining, in the data signal, data representative of a current residual block associated with the current block to be decoded, a module for determining at least one predictor block of the current block to be decoded, a module for determining a pair of mathematical operations including a transformation operation and a permutation operation, a transformation module for applying the transformation operation of the determined pair to the data representative of the current residual block, a permutation module for applying the permutation operation of the determined pair to the transformed data, a prediction module for reconstructing the current block with the aid of the determined predictor block and the data delivered by the permutation module.

Such an decoding device is notably capable of implementing the aforementioned method of decoding.

The invention also concerns a computer program comprising instructions for implementing one of the methods of encoding and decoding according to the invention, when it is executed on a computer.

This program may use any programming language, and be in the form of source code, object code, or intermediate code between source code and object code, such as in a partially compiled form, or in any other desirable form.

The invention is also aimed at a recording medium readable by a computer on which a computer program is recorded, this program comprising instructions suitable for implementing one of the methods of encoding or decoding according to the invention, as described above.

The invention is also aimed at a recording medium readable by a computer on which a computer program is recorded, this program comprising instructions suitable for implementing the method of encoding or decoding according to the invention, as described above.

The recording medium may be any entity or device capable of storing the program. For example, the medium may comprise a means of storage, such as a ROM, e.g. a CD ROM or a microelectronic circuit ROM, or a magnetic recording means, e.g. a USB stick or a hard disk.

Secondly, the recording medium may be a transmissible medium such as an electrical or optical signal, which may be conveyed via an electrical or optical cable, by radio or by other means. The program according to the invention may in particular be downloaded on an Internet type network.

Alternatively, the recording medium may be an integrated circuit incorporating the program, the circuit being suitable for executing or for being used in the execution of the aforementioned method of encoding or decoding.

The method of decoding, the encoding device, the decoding device, the computer programs and the aforementioned corresponding recording media have at least the same advantages as those conferred by the method of encoding according to the present invention.

BRIEF DESCRIPTION OF THE DRAWINGS

Other features and advantages will appear on reading a preferred embodiment described with reference to the figures in which:

FIGS. 3B and 3C represent a table containing various permutation-transformation pairs which are used in the case of an 8×8 block.

DETAILED DESCRIPTION OF ILLUSTRATIVE EMBODIMENTS

Detailed Description of the Encoding Portion

One embodiment of the invention will now be described, in which the method of encoding according to the invention is used for encoding an image or a sequence of images in a binary stream similar to that obtained by an encoding compliant, for example, with the HEVC standard.

In this embodiment, the method of encoding according to the invention is, for example, implemented in software or hardware by modifications to an encoder initially compliant with the HEVC standard. The method of encoding according to the invention is represented in the form of an algorithm comprising steps C1 to C15 as represented in FIG. 1.

Figure 2:
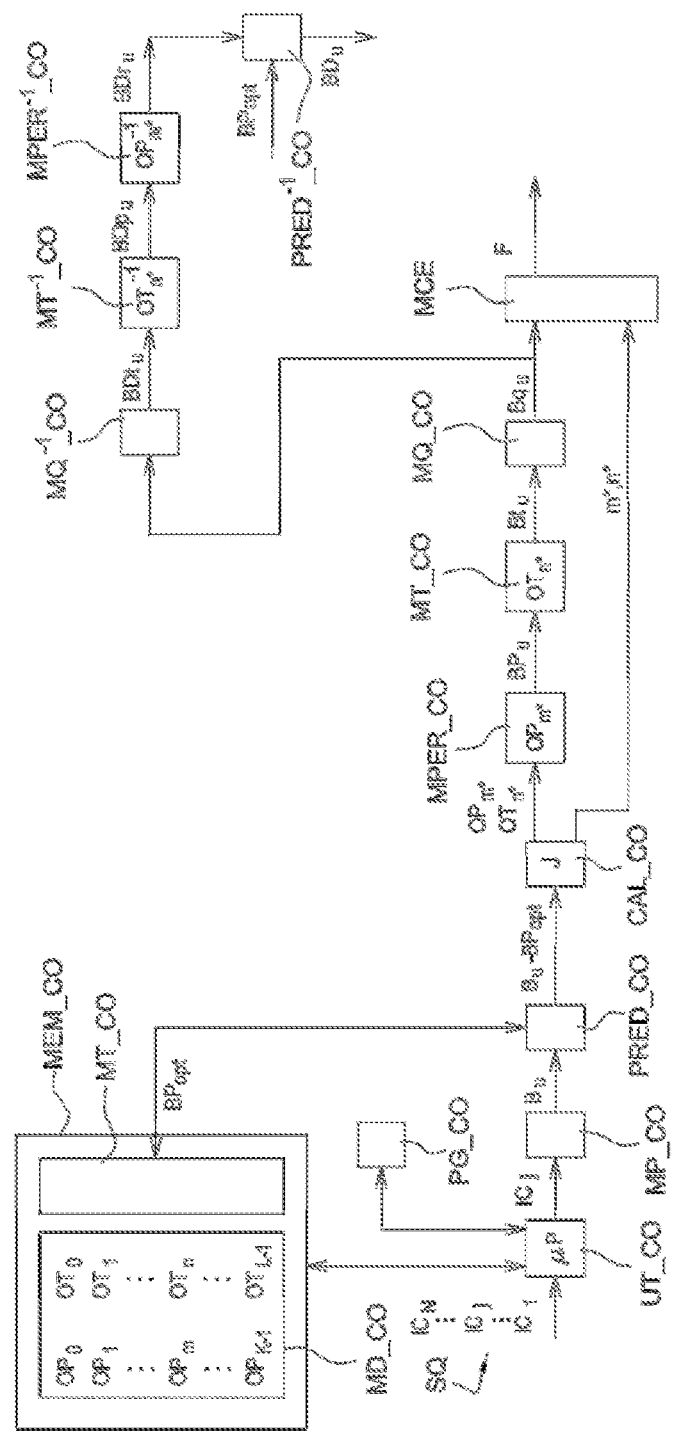
FIG. 2 represents an embodiment of an encoding device according to the invention.

According to the embodiment of the invention, the method of encoding according to the invention is implemented in an encoding device CO represented in FIG. 2.

As illustrated in FIG. 2, such an encoding device includes a memory MEM_CO including a buffer memory MT_CO, a processing unit UT_CO provided, for example, with a microprocessor µP and controlled by a computer program PG_CO which implements the method of encoding according to the invention. At initialization, the code instructions of the computer program PG_CO are, for example, loaded into a RAM memory (not represented), before being executed by the processor of the processing unit UT_CO.

Figure 1:
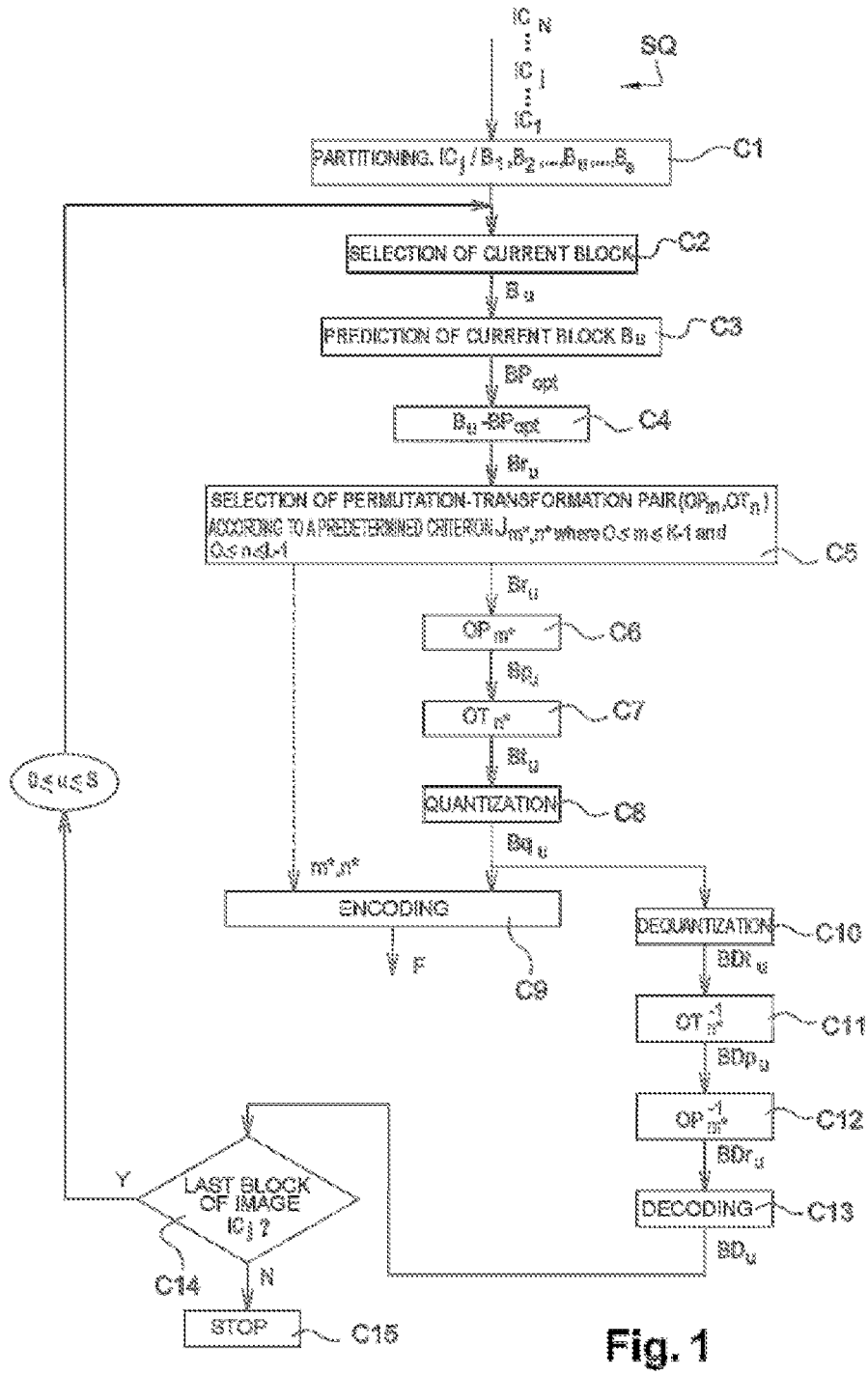
FIG. 1 represents the steps of the method of encoding according to the invention.

The method of encoding represented in FIG. 1 applies to any current image of a sequence SQ of images to be encoded.

In the course of a step C1 represented in FIG. 1, in a way known per se, a current image $IC_j$ belonging to the sequence SQ of images $IC_1, \ldots, IC_j, \ldots, IC_N$ ($1 \leq j \leq N$), is partitioned into a plurality of blocks $B_1, B_2, \ldots, B_u, \ldots, B_S$ ($1 \leq u \leq S$) of given size, typical values of size being 64×64, 32×32 or 16×16 pixels. Such a partitioning step is implemented by a partitioning software module MP_CO represented in FIG. 2, which module is controlled by the microprocessor μP of the processing unit UT_CO.

It should be noted that within the meaning of the invention, the term "block" means "coding unit" (from the English term). The latter terminology is used notably in the HEVC standard, e.g. in the document "ITU-T Recommendation H.265/Standard ISO/IEC 23008-2".

In particular, such a coding unit groups together sets of pixels of rectangular or square shape, also called blocks, macroblocks, or sets of pixels exhibiting other geometric shapes.

Preferably in the invention, the blocks to be encoded are particularly of a size of a multiple power of 2, e.g. of type 4×4 and 8×8. However, the invention also applies more generally to blocks of size M×M (M=16, 32 or 64). P×M and M×P blocks are also usable with P and M taking their value in the set 2, 4, 8, 16, 32 and 64.

Said blocks $B_1, B_2, \ldots, B_u, \ldots, B_S$ are intended to be encoded according to a predetermined scanning order, which is, for example, of the raster scan type. This means that the blocks are encoded one after the other, from left to right, then downward.

Other types of scanning are, of course, possible. Thus, it is possible to cut the image $IC_j$ into multiple subimages called slices and independently apply this type of cutting on each subimage. It is also possible to encode not a succession of rows, as explained above, but a succession of columns. It is also possible to scan the rows or columns in one direction or the other.

Each block may itself be further divided into subblocks which are themselves subdivisible.

In the course of a step C2 represented in FIG. 1, the encoder CO selects as the current block a first block to be encoded $B_u$ of the image $IC_j$, such as, for example, the first block $B_1$.

In the course of a step C3 represented in FIG. 1, the prediction of the current block $B_u$ is performed by known techniques of intra and/or inter prediction. For this purpose, the block $B_u$ is predicted with respect to at least one predictor block in accordance with a mode of prediction selected from among a plurality of predetermined modes of prediction.

Such a predictor block is, for example, a block of pixels which has already been encoded or encoded then decoded or not decoded. Such a predictor block is previously stored in the buffer memory MT_CO of the encoder CO as represented in FIG. 2.

At the end of the prediction step C3, an optimal predictor block $BP_{opt}$ is obtained after said predetermined modes of prediction have been placed in competition, e.g. by minimizing a rate-distortion criterion well known to the person skilled in the art. The block $BP_{opt}$ is considered as an approximation of the current block $B_u$. The information items relating to this prediction are intended to be included in a signal or data stream to be transmitted to a decoder. Such information items notably include the type of prediction (inter or intra), and, where applicable, the mode of prediction selected, the type of partitioning of the current block if the latter has been subdivided, the reference image index and the motion vector used in the case where a mode of inter prediction has been selected. These information items are compressed by the encoder CO.

In the course of a step C4 represented in FIG. 1, the data relating to the current block $B_u$ are compared with the data of the predictor block $BP_{opt}$. More precisely, in the course of this step, the difference between the predictor block obtained $BP_{opt}$ and the current block $B_u$ is calculated conventionally.

A set of residual data, called a residual block $Br_u$ is then obtained at the end of step C4.

Steps C3 and C4 are implemented by a predictive encoding software module PRED_CO represented in FIG. 2, which module is controlled by the microprocessor μP of the processing unit UT_CO.

In the course of a step C5 represented in FIG. 1, a pair of mathematical operations including a permutation operation $OP_{m*}$ and a transformation operation $OT_{n*}$ is selected, according to a predetermined criterion, from among a plurality of permutation operations $OP_0, OP_1, \ldots, OP_m, \ldots, OP_{K-1}$, with $0 \leq m \leq K-1$ and $0 \leq m* \leq K-1$, and a plurality of transformation operations $OT_0, OT_1, \ldots, OT_n, \ldots, OT_{L-1}$, with $0 \leq n \leq L-1$ and $0 \leq n* \leq L-1$. The plurality of permutation and transformation operations is stored in a dedicated memory MD_CO of the encoder CO in FIG. 2.

Such a step C5 is implemented by a calculation software module CAL_CO represented in FIG. 2, which module is controlled by the microprocessor μP of the processing unit UT_CO.

The plurality of transformation operations $OT_0, OT_1, \ldots, OT_n, \ldots, OT_{L-1}$ includes one or more 1D transforms.

A 1D transform means a discrete transform of size M×M operating on vectors of size M. For this purpose:

a first transformation operation is applied vector by vector on a block of size M×M, a transposition operation is applied on the transformed block, a second transformation operation is applied on the block obtained after transposition, also vector after vector.

This 1D transform rests on bases expressed in trigonometric form in the way that discrete sine (DST) or discrete cosine (DCT) transforms are. Preferably, the transforms belonging to the plurality of transforms $OT_0, OT_1, \ldots, OT_n, \ldots, OT_{L-1}$ are DCT II, III and IV transforms and DST IV, VI and VII transforms, which are described in the document "Relationship between DCT-II, DCT-VI, and DST-VII transforms", Reznik ICASSP 2013.

Among these, DCT II, III, and DST VII and IV transforms are particularly useful for their ability to make the residual signal compact in the frequency domain.

Such transforms are, for example, of size 4×4, 8×8 etc.

As a variant, the transforms used may be alternating, i.e. a transform of a first type and a transform of a second type are applied respectively on the rows and on the columns of the current residual block $Br_u$ of which the data have been previously permuted as will be described below in the description.

According to this variant, the aforementioned transforms may also be rectangular. For a current residual block $Br_u$ of rectangular shape, the row transform will have a different size from the column transform.

It should be noted that the combination of the row transform and the column transform may be applied directly to the current residual block $Br_u$.

In the field of video encoding/decoding, with a view to making an implementation possible on fixed point processors, such transforms are approximated, i.e. the real values are approximated by rational numbers. Therefore the transforms are not exactly retrieved in the strict sense but rather in an approximated form.

Thus, for example, in the case of a DST VII transform of size 4, the latter may be expressed according to the equation:

$$S_{i,k} = \frac{2}{3}\sin\left[\pi \cdot \frac{(2k+1)(i+1)}{9}\right] \text{ with } 0 \leq i < 4 \text{ and}$$
$$0 \leq k < 4$$

The following 4×4 matrix of coefficients is then obtained, with i evolving along the columns and k evolving along the rows:

| 0.2280 | 0.4285 | 0.5774 | 0.6565 |
|---|---|---|---|
| 0.5774 | 0.5774 | 0.0000 | 0.5774 |
| 0.6565 | 0.2280 | 0.5774 | 0.4285 |
| 0.4285 | 0.6565 | 0.5774 | 0.2280 |

Said coefficient values above may also be represented in the form of fractions in the following way, which makes an effective fixed point implementation possible:

| 29/128 | 55/128 | 74/128 | 84/128 |
|---|---|---|---|
| 74/128 | 74/128 | 0 | −74/128 |
| 84/128 | −29/128 | −74/128 | 55/128 |
| 55/128 | −84/128 | 74/128 | −29/128 |

The plurality of permutation operations $OP_0$, $OP_1$, ..., $OP_m$, ..., $OP_{K-1}$ includes one or more permutation operations. Within the meaning of the invention, a permutation operation, an example of which is represented below, is defined in the form of a matrix containing only 1s and 0s. In the example represented below, such a permutation matrix is applied to a set $E_{EN}$ of successive coefficients, e.g. sixteen in number for a block of size 4×4, of respective indices $I_0$, $I_1$, $I_2$, $I_3$, $I_4$, $I_5$, $I_6$, $I_7$, $I_8$, $I_9$, $I_{10}$, $I_{11}$, $I_{12}$, $I_{13}$, $I_{14}$, $I_{15}$.

| $E_{SO}$ | | | | | permutation matrix | | | | | | | | | | | | $E_{EN}$ |
|---|---|---|---|---|---|---|---|---|---|---|---|---|---|---|---|---|---|
| $I_3$ | 0 | 0 | 0 | 1 | 0 | 0 | 0 | 0 | 0 | 0 | 0 | 0 | 0 | 0 | 0 | 0 | $I_0$ |
| $I_2$ | 0 | 0 | 1 | 0 | 0 | 0 | 0 | 0 | 0 | 0 | 0 | 0 | 0 | 0 | 0 | 0 | $I_1$ |
| $I_1$ | 0 | 1 | 0 | 0 | 0 | 0 | 0 | 0 | 0 | 0 | 0 | 0 | 0 | 0 | 0 | 0 | $I_2$ |
| $I_0$ | 1 | 0 | 0 | 0 | 0 | 0 | 0 | 0 | 0 | 0 | 0 | 0 | 0 | 0 | 0 | 0 | $I_3$ |
| $I_7$ | 0 | 0 | 0 | 0 | 0 | 0 | 0 | 1 | 0 | 0 | 0 | 0 | 0 | 0 | 0 | 0 | $I_4$ |
| $I_6$ | 0 | 0 | 0 | 0 | 0 | 0 | 1 | 0 | 0 | 0 | 0 | 0 | 0 | 0 | 0 | 0 | $I_5$ |
| $I_5$ | 0 | 0 | 0 | 0 | 0 | 1 | 0 | 0 | 0 | 0 | 0 | 0 | 0 | 0 | 0 | 0 | $I_6$ |
| $I_4$ | 0 | 0 | 0 | 0 | 1 | 0 | 0 | 0 | 0 | 0 | 0 | 0 | 0 | 0 | 0 | 0 | $I_7$ |
| $I_{11}$ | 0 | 0 | 0 | 0 | 0 | 0 | 0 | 0 | 0 | 0 | 0 | 1 | 0 | 0 | 0 | 0 | $I_8$ |
| $I_{10}$ | 0 | 0 | 0 | 0 | 0 | 0 | 0 | 0 | 0 | 0 | 1 | 0 | 0 | 0 | 0 | 0 | $I_9$ |
| $I_9$ | 0 | 0 | 0 | 0 | 0 | 0 | 0 | 0 | 0 | 1 | 0 | 0 | 0 | 0 | 0 | 0 | $I_{10}$ |
| $I_8$ | 0 | 0 | 0 | 0 | 0 | 0 | 0 | 0 | 1 | 0 | 0 | 0 | 0 | 0 | 0 | 0 | $I_{11}$ |
| $I_{15}$ | 0 | 0 | 0 | 0 | 0 | 0 | 0 | 0 | 0 | 0 | 0 | 0 | 0 | 0 | 0 | 1 | $I_{12}$ |
| $I_{14}$ | 0 | 0 | 0 | 0 | 0 | 0 | 0 | 0 | 0 | 0 | 0 | 0 | 0 | 0 | 1 | 0 | $I_{13}$ |
| $I_{13}$ | 0 | 0 | 0 | 0 | 0 | 0 | 0 | 0 | 0 | 0 | 0 | 0 | 0 | 1 | 0 | 0 | $I_{14}$ |
| $I_{12}$ | 0 | 0 | 0 | 0 | 0 | 0 | 0 | 0 | 0 | 0 | 0 | 0 | 1 | 0 | 0 | 0 | $I_{15}$ |

At the end of the permutation operation above, a set $E_{SO}$ of permuted indices $I_3$, $I_2$, $I_1$, $I_0$, $I_7$, $I_6$, $I_5$, $I_4$, $I_{11}$, $I_{10}$, $I_9$, $I_8$, $I_{15}$, $I_{14}$, $I_{13}$, $I_{12}$ is obtained. Such a permutation operation has the advantage of not generating calculating complexity in the encoder CO in FIG. 2, since it involves just a redirection of the indices.

More precisely in the course of the aforementioned step C5, the choice is made of the permutation-transformation pair to be used which optimizes the encoding performance of the current block $B_u$ to be encoded. Such a choice may be made in several ways.

According to one embodiment, the predetermined criterion of choice used in step C5 is the rate-distortion criterion well known to the person skilled in the art which consists in measuring a weighting of the distortion after quantization with the transmission cost of the quantized samples. Typically, for a permutation $OP_m$—transformation $OT_n$ pair considered, the criterion $J_{m,n}$ is expressed in the following way:

$J_{m,n}(\text{lambda}) = \|x - OP_m{}^t OT_n{}^{-1}\lfloor Xm,n\rfloor\|^2 + \text{lambda} \cdot R(\lfloor Xm,n\rfloor)$, where:

Lambda is a Lagrangian weighting operator governing the transmission rate constraint, $(\ )^t$ is the transposition matrix operator, $OT^{-1}{}_n$ represents the inverse transformation, $\lfloor X_{m,n}\rfloor$ represents the approximation of $X_{m,n}$ performed according to the quantization operator, $X_{m,n}$ being the result of the transformation of the current block $B_u$ to be encoded by the pair of operations $OT_n$, $OP_m$ considered.

R( ) is a function calculating the rate required for transmitting the quantized values.

The function R may be obtained by complete encoding of the information items, i.e. by way of counting the information items necessary for transmitting the quantized and encoded values, or by an estimate of the rate, e.g. which may based on a calculation of the sum of the absolute values of the quantized values or on a count of the values quantized to zero.

Following a comparison between the various values obtained for $J_{m,n}$, the lowest value calculated by the calculation module CAL_CO in FIG. 2 is retained. Such a value is denoted by $J_{m^*,n^*}$ and is associated with a pair of permutation $OP_{m^*}$—transformation $OT_{n^*}$ operations considered.

In a simplified embodiment of the invention, the plurality of permutation operations includes, for example, two permutations $OP_0$ and $OP_1$, while the plurality of transformation operations includes a single transformation $OT_0$, e.g. the DST VII. For this purpose, in the course of the aforementioned step C5, only two rate-distortion criteria are calculated, namely:

the criterion $J_{0,0}$ which depends on the permutation $OP_0$ and the transformation $OT_0$, and the criterion $J_{1,0}$ which depends on the permutation $OP_1$ and the transformation $OT_0$.

The calculation module CAL_CO in FIG. 2 compares the two criteria $J_{0,0}$ and $J_{1,0}$, retains the one which has the lowest value and associates an index m*,n* with this value. Thus, if $J_{0,0} < J_{1,0}$, then m*,n*=0, else m*,n*=1.

According to one variant of the embodiment of the aforementioned selection step C5, the latter may be performed in conjunction with the search for the optimal predictor block $B_{opt}$ during the aforementioned prediction step C3. More precisely, for each mode of prediction considered, one permutation-transformation pair is determined as minimizing the aforementioned rate-distortion criterion $J_{m,n}$. In this way, the rate information items during the estimation of the criterion $J_{m,n}$ take into account the transmission of the mode of prediction. Thus, all the prediction/permutation-transformation combinations are evaluated for retaining that which minimizes the rate-distortion criterion.

Such a variant may be further extended by taking into account various possible sizes of the current block. The utility of a partitioning of the current block into subblocks may be decided taking into account the rate-distortion criterion, by taking into account the available permutation-transformation pairs.

Figure 3A:
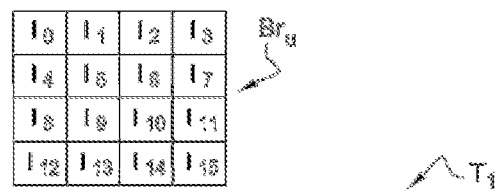
FIG. 3A represents a table containing various permutation-transformation pairs which are used in the case of a 4×4 block.
Figure 3B:
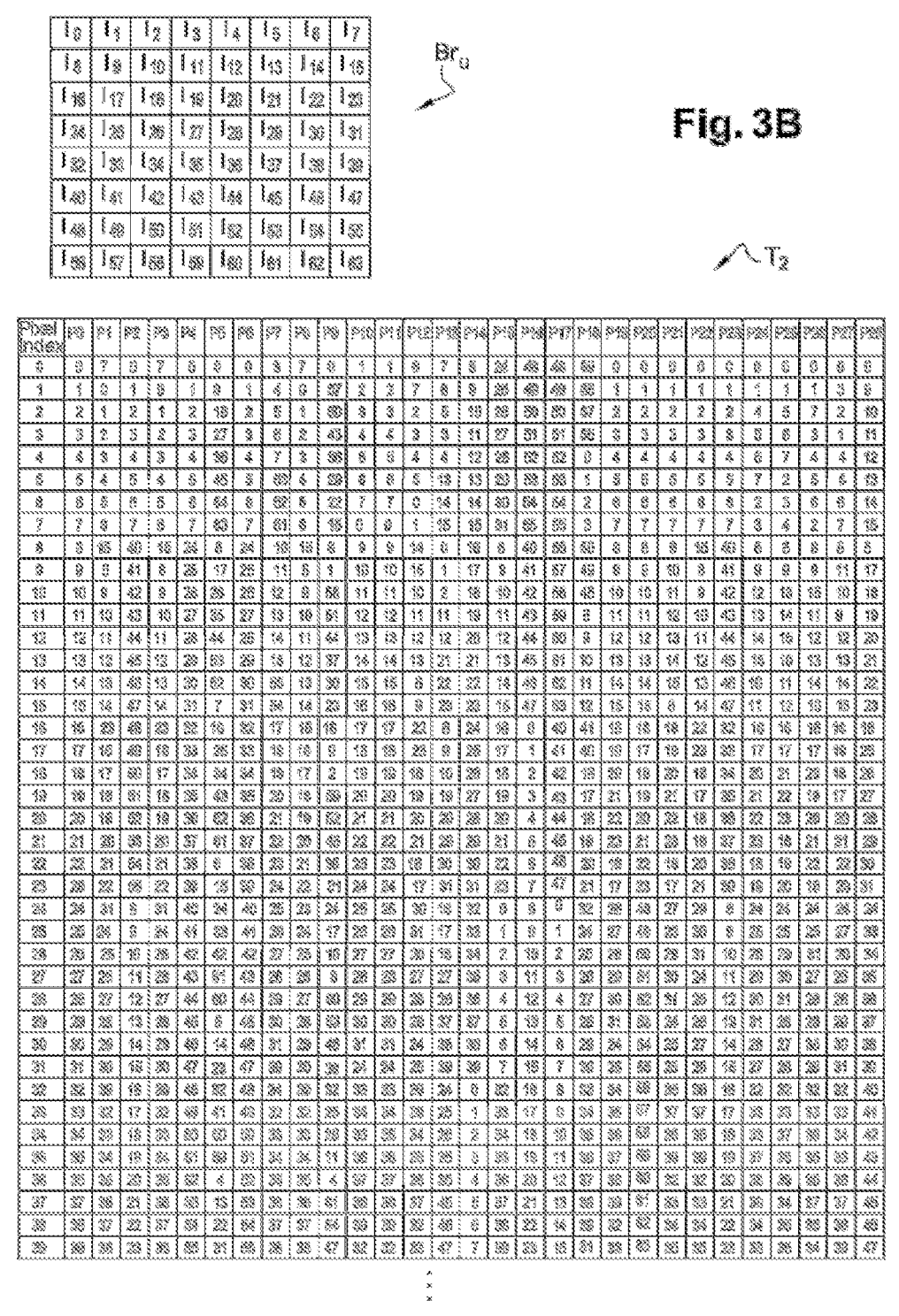
Figure 3C:

Examples of transformation-permutation pairs are represented with reference to FIGS. 3A, 3B and 3C.

In the example of FIG. 3A, a table T1 contains the transformation-permutation pairs which are intended to be applied to a current residual block $Br_u$ of size 4×4 and successive pixel indices $I_0$ to $I_{15}$.

In the example of FIGS. 3B and 3C, a table T2 contains the transformation-permutation pairs which are intended to be applied to a current residual block $Br_u$ of size 8×8 and successive pixel indices $I_0$ to $I_{63}$.

With reference to FIG. 3A, table T1 includes, for example, 28 permutations $P_0$ to $P_{27}$. The first column of table T1 entitled "Pixel Index" indicates the pixel index number considered (between 0 and 15) in the current residual block $Br_u$. The following columns are each associated with a particular permutation ($P_0$ to $P_{27}$), the permutation $P_0$ being termed the "identity" permutation since it has no effect on the order of the pixel indices. For a given permutation, each pixel index indicated by the "Pixel Index" column is replaced by the pixel index number indicated by the corresponding value in the selected column.

Each column $P_0$ to $P_{27}$ is associated with a particular DST or DCT transform according to the permutation considered, said particular transform being indicated in the last row of table T1.

With reference to FIGS. 3B and 3C, table T2 includes, for example, 29 permutations $P_0$ to $P_{28}$. The first column of table T2 entitled "Pixel Index" indicates the pixel index number considered (between 0 and 63) in the current residual block $Br_u$. The following columns are each associated with a particular permutation ($P_0$ to $P_{28}$), the permutation $P_0$ being termed the "identity" permutation since it has no effect on the order of the pixel indices. For a given permutation, each pixel index indicated by the "Pixel Index" column is replaced by the pixel index number indicated by the corresponding value in the selected column.

In the example of FIGS. 3B and 3C, each permutation is associated with the same DCT transform.

The permutations indicated in tables T1 and T2 are established by learning. For this purpose, the permutations are derived from simple geometric transformations: order inversion of columns/rows, movement of blocks, movement of rows or columns.

Some permutations are determined for their simplicity of implementation, in the sense that the transformations considered are slightly affected when the inter-pixel relationship is not modified, i.e. after permutation, each pixel remains close to its neighbors before permutation. A preferred permutation is, for example, a transposition operator which gradually moves the data of the pixel block, in a predetermined direction. Other permutations are envisaged.

For example, in table T1 represented in FIG. 3A:
the permutation $P_1$ is a mirror operator of the pixel block, the pixel indices being inverted with respect to each other by means of a vertical symmetry,
the permutation $P_4$ makes it possible to invert the pixel indices by transposition, i.e. diagonal symmetry, with respect to a 45° angle dividing the residual block $Br_u$.

The various permutations have been learned through a study of the intrinsic properties of the residual blocks. According to the luminous power of the average residue per pixel, the pixels are reordered so that they are compatible with a particular transformation. It is known in the prior art that the DCT is appropriate for encoding residues having a profile of constant brightness, i.e. the residual block has a relatively uniform brightness per pixel. The DST has an appropriate profile for residual blocks having less brightness in the pixels located at the top of the block (e.g. indices $I_0$ to $I_3$ in FIG. 3A) and on the left (e.g. indices $I_0$ to $I_{12}$ in FIG. 3A).

Thus, in particular in table T1 of FIG. 3A, the permutations are established according to the transformation indicated in the last row.

The "identity" permutation $P_0$ forms part of the permutations retained, when the residual block $Br_u$ has a shape compatible with the associated transformation. On the other hand, when the residual block is incompatible with the associated transformation, then the aforementioned rate-distortion criterion $J_{m,n}$ will have a much lower value with a permutation other than the permutation $P_0$.

Other configurations of permutation-transformation pairs are, of course, possible and some will be mentioned farther on in the description.

In the course of a step C6 represented in FIG. 1, the permutation operation $OP_{m^*}$ of said pair of selected operations is applied to the data of the current residual block $Br_u$, for producing a permuted block $Bp_u$.

Step C6 is implemented by a permutation software module MPER_CO, as represented in FIG. 2, which module is controlled by the microprocessor µP of the processing unit UT_CO.

In the course of a step C7 represented in FIG. 1, the transformation operation $OT_{n^*}$ of said pair of selected operations is applied to the data of the permuted block $Bp_u$, for producing a transformed block $Bt_u$.

Step C7 is implemented by a transformation software module MT_CO, as represented in FIG. 2, which module is controlled by the microprocessor µP of the processing unit UT_CO.

The transformation operation $OT_{n^*}$ consists in transforming the permuted block $Bp_u$ from the spatial domain to the frequency domain in the following form:

$$X_{Bt_u} = B \cdot (A x_{Bp_u})^t$$

where:

$x_{Bp_u}$ represents in matrix form the current permuted block $Bp_u$ in the spatial domain, $X_{Bt_u}$ represents in matrix form the block obtained in the transformed domain, B and A represent 1D transforms from the families presented above.

Note that the result of the transform may also be written in the mathematically equivalent form:

$$X = Sx$$

where:

X and x then appear in the form of vectors,

S represents a transform matrix which contains the square of the number of elements contained in x. The matrix S is written as a generalized product of the 1D matrices B and A. In other words the matrix S is formed by constructing an M×M matrix (M is the size of the 1D transforms), constructed by repetition of the matrix A by blocks and multiplication of each of the matrices A by a term of the matrix B. As illustrated below, for the case M=4, the matrix S of type 16×16 is then obtained:

| $B_{0,0}*A$ | $B_{0,1}*A$ | $B_{0,2}*A$ | $B_{0,3}*A$ |
| $B_{1,0}*A$ | $B_{1,1}*A$ | $B_{1,2}*A$ | $B_{1,3}*A$ |
| $B_{2,0}*A$ | $B_{2,1}*A$ | $B_{2,2}*A$ | $B_{2,3}*A$ |
| $B_{3,0}*A$ | $B_{3,1}*A$ | $B_{3,2}*A$ | $B_{3,3}*A$ |

In a preferred embodiment, said matrix S is a matrix representative of a DST.

The permutation operation $OP_{m*}$ consists in applying a permutation on the entries of the matrix $X_{Br_u}$ representative of the current residual block $Br_u$ applied to the pixels in the manner represented below:

| $Bp_u$ | | | | | permutation matrix $P_m$ | | | | | | | | | | | | | $Br_u$ |
|---|---|---|---|---|---|---|---|---|---|---|---|---|---|---|---|---|---|---|
| $I_3$ | 0 | 0 | 0 | 1 | 0 | 0 | 0 | 0 | 0 | 0 | 0 | 0 | 0 | 0 | 0 | 0 | 0 | $I_0$ |
| $I_2$ | 0 | 0 | 1 | 0 | 0 | 0 | 0 | 0 | 0 | 0 | 0 | 0 | 0 | 0 | 0 | 0 | 0 | $I_1$ |
| $I_1$ | 0 | 1 | 0 | 0 | 0 | 0 | 0 | 0 | 0 | 0 | 0 | 0 | 0 | 0 | 0 | 0 | 0 | $I_2$ |
| $I_0$ | 1 | 0 | 0 | 0 | 0 | 0 | 0 | 0 | 0 | 0 | 0 | 0 | 0 | 0 | 0 | 0 | 0 | $I_3$ |
| $I_7$ | 0 | 0 | 0 | 0 | 0 | 0 | 0 | 1 | 0 | 0 | 0 | 0 | 0 | 0 | 0 | 0 | 0 | $I_4$ |
| $I_6$ | 0 | 0 | 0 | 0 | 0 | 0 | 1 | 0 | 0 | 0 | 0 | 0 | 0 | 0 | 0 | 0 | 0 | $I_5$ |
| $I_5$ | 0 | 0 | 0 | 0 | 0 | 1 | 0 | 0 | 0 | 0 | 0 | 0 | 0 | 0 | 0 | 0 | 0 | $I_6$ |
| $I_4$ | 0 | 0 | 0 | 0 | 1 | 0 | 0 | 0 | 0 | 0 | 0 | 0 | 0 | 0 | 0 | 0 | 0 | $I_7$ |
| $I_{11}$ | 0 | 0 | 0 | 0 | 0 | 0 | 0 | 0 | 0 | 0 | 0 | 1 | 0 | 0 | 0 | 0 | 0 | $I_8$ |
| $I_{10}$ | 0 | 0 | 0 | 0 | 0 | 0 | 0 | 0 | 0 | 0 | 1 | 0 | 0 | 0 | 0 | 0 | 0 | $I_9$ |
| $I_9$ | 0 | 0 | 0 | 0 | 0 | 0 | 0 | 0 | 0 | 1 | 0 | 0 | 0 | 0 | 0 | 0 | 0 | $I_{10}$ |
| $I_8$ | 0 | 0 | 0 | 0 | 0 | 0 | 0 | 0 | 1 | 0 | 0 | 0 | 0 | 0 | 0 | 0 | 0 | $I_{11}$ |
| $I_{15}$ | 0 | 0 | 0 | 0 | 0 | 0 | 0 | 0 | 0 | 0 | 0 | 0 | 0 | 0 | 0 | 0 | 1 | $I_{12}$ |
| $I_{14}$ | 0 | 0 | 0 | 0 | 0 | 0 | 0 | 0 | 0 | 0 | 0 | 0 | 0 | 0 | 0 | 1 | 0 | $I_{13}$ |
| $I_{13}$ | 0 | 0 | 0 | 0 | 0 | 0 | 0 | 0 | 0 | 0 | 0 | 0 | 0 | 0 | 1 | 0 | 0 | $I_{14}$ |
| $I_{12}$ | 0 | 0 | 0 | 0 | 0 | 0 | 0 | 0 | 0 | 0 | 0 | 0 | 0 | 1 | 0 | 0 | 0 | $I_{15}$ |

The relationship $X_{Bt_u} = SOP_{m*} X_{Br_u}$ is then obtained, where $P_m$ represents a permutation matrix of the indices of x, which has the effect of an inversion of the pixel positions.

In the course of a step C8 represented in FIG. 1, the transformed block $Bt_u$ is quantized, according to a conventional quantization operation, such as, for example, a scalar or vector quantization. A block $Bq_u$ of quantized coefficients is then obtained. Such a step is performed by means of a quantization software module MQ_CO as represented in FIG. 2, which module is controlled by the microprocessor µP of the processing unit UT_CO.

In the course of a step C9 represented in FIG. 1, the data of the block $Bq_u$ of quantized coefficients is encoded. In the preferred embodiment, the encoding performed is an arithmetic or Huffman entropy encoding which is known as such. Step C9 then consists in:

reading the symbol or symbols which are associated with said current block, associating digital information, such as bits, with the symbol(s) read.

Such an entropy encoding step is implemented by an entropy encoding software module MCE represented in FIG. 2, which module is controlled by the microprocessor µP of the processing unit UT_CO. The entropy encoding module MCE is, for example, of the CABAC ("Context Adaptive Binary Arithmetic Coder" in English) type. It may also be a Huffman encoder known as such.

In the course of said step C9, the index m*,n* of the criterion $J_{m*,n*}$ retained in the aforementioned step C5 is optionally encoded. Such a step is necessary, when the decoder is not capable of retrieving this information.

If m*,n* must be transmitted to the decoder, it is then, for example, expressed in a fixed-length binary code.

If, for example, four values of permutation-transformation pairs: 0, 1, 2, 3 must be signaled,
the value 0 is associated, for example, with the code 00,
the value 1 is associated, for example, with the code 01,
the value 2 is associated, for example, with the code 10,
the value 3 is associated, for example, with the code 11.

As a variant, the index m*,n* may be expressed with the aid of a variable-length code.

In the case, for example, of four values of permutation-transformation pairs: 0, 1, 2, 3 to be signaled:
the value 0 is associated, for example, with the code 0,
the value 1 is associated, for example, with the code 10,
the value 2 is associated, for example, with the code 110,
the value 3 is associated, for example, with the code 111.

According to a preferred embodiment, the transmission of the index m*,n* is separated into two indicators:
a flag signaling the first bit of the codes above,
and a complementary syntax element which indicates the less probable permutation-transformation pairs in binary form.

The flag is advantageously encoded with the aid of an arithmetic encoder separate from the encoding of the pair number retained. A CABAC encoder is preferably used, with a particular context according to the size of the subdivision of the current block. It is thus possible to obtain a significant reduction in the cost of this flag when the latter is very frequently employed in a given state, i.e. its probability of being '0' or '1' is very high.

Thus, according to this preferred mode:
the value 0 is associated, for example, with the flag set to 0,
the value 1 is associated, for example, with the flag set to 1, with complement 0,
the value 2 is associated, for example, with the flag set to 1, and complement 10,
the value 3 is associated, for example, with the flag set to 1, and complement 11.

According to another preferred embodiment, the index m*,n* is transmitted only by means of a flag. This preferred mode is applicable in the case where a single transform, e.g. a DST, is applied and where two permutation operations $OP_0$ and $OP_1$ may be applied in combination with the DST. The permutation-transformation pair $SOP_0$ or $SOP_1$ selected in the aforementioned step C5 will then be signaled by one bit. According to a given convention by way of example:
the selection of the pair $SOP_0$ is represented by one bit set to '1',
the selection of the pair $SOP_1$ is represented by one bit set to '0'.

In this preferred embodiment, a CABAC encoder is preferably used, with a particular context according to the size of the subdivision of the current block. It is thus possible to obtain a significant reduction in the cost of this flag when the latter is very frequently employed in a given state, i.e. its probability of being '0' or '1' is very high.

In the case where more than two permutation-transformation pairs may be selected, a fixed- or variable-length code will be used.

According to another possible embodiment, in the course of step C9, a partial encoding of the value of the index m*,n* is performed. As will be described farther on in the description, such an embodiment is possible, when the decoder is itself capable of retrieving all or part of the index m*,n*.

As a variant, this other embodiment may also be combined with the signaling implemented in the preferred embodiment described earlier.

According to a particular configuration given by way of example:
in the case where a single transform S, e.g. a DST, is applied and where a permutation operation $OP_0$ is applied in combination with the DST, the permutation-transformation pair $SOP_0$ selected in the aforementioned step C5 will then be signaled by one bit set to '0',
in the case where a single transform S, e.g. a DST, is applied and where multiple permutation operations may be applied in combination with the DST, the permutation-transformation pair selected in the aforementioned step C5 will then be signaled by one bit set to '1'.

At the end of the encoding step C9, a signal or data stream F which contains the set of the encoded data of the block of quantized coefficients $Bq_u$ and optionally the entirety or one part of the index m*,n* encoded is then delivered. Such a stream is then transmitted via a communication network (not represented), to a remote terminal. This comprises the decoder DO represented in FIG. 4. In a way known per se, the stream F further includes some information encoded by the encoder CO, such as the type of prediction (inter or intra), and, where applicable, the mode of prediction selected, the type of partitioning of the block if the latter has been partitioned, the reference image index and the motion vector used in the inter prediction mode.

In the course of a step C10 represented in FIG. 1, the block $Bq_u$ is dequantized, according to a conventional dequantization operation, which is the inverse operation of the quantization performed in step C8. A block of dequantized coefficients $BDt_u$ is then obtained.

Such a dequantization step is performed by an inverse quantization software module $MQ^{-1}\_CO$, as represented in FIG. 2, which module is controlled by the microprocessor $\mu P$ of the processing unit UT_CO.

In the course of a step C11 represented in FIG. 1, the transformation operation the inverse of the transformation operation $OT_{n*}$ is applied to the data of the block of dequantized coefficients $BDt_u$, for producing a decoded permuted block $BDp_u$.

Step C11 is implemented by a transformation software module $MT^{-1}\_CO$, as represented in FIG. 2, which module is controlled by the microprocessor $\mu P$ of the processing unit UT_CO.

In the course of a step C12 represented in FIG. 1, the permutation operation $OP^{-1}_{m*}$, the inverse of the permutation operation $OP_{m*}$, is applied to the data of the decoded permuted block $BDp_u$, for producing a decoded residual block $BDr_u$.

Step C12 is implemented by a permutation software module $MPER^{-1}\_CO$, as represented in FIG. 2, which module is controlled by the microprocessor $\mu P$ of the processing unit UT_CO.

In the course of a step C13 represented in FIG. 1, the decoded block $BD_u$ is constructed by adding the decoded residual block $BDr_u$ to the predictor block $BP_{opt}$ obtained in the aforementioned step C3. It should be noted that this last block is the same as the decoded block obtained at the end of the method of decoding the image $IC_j$ which will be described farther on in the description. The decoded block $BD_u$ is then stored in the buffer memory MT_CO in FIG. 2, in order to be used by the encoder CO as a predictor block for a following block to be encoded.

Such a step is implemented by an inverse predictive encoding software module $PRED^{-1}\_CO$ represented in FIG. 2, which module is controlled by the microprocessor $\mu P$ of the processing unit UT_CO.

In the course of a step C14 represented in FIG. 1, the encoder CO tests whether the current block $B_u$ which has just been encoded is the last block of the image $IC_j$.

If the current block is the last block of the image $IC_j$, in the course of a following step C15 represented in FIG. 1, the method of encoding is terminated.

If such is not the case, the step C2 of selecting the following block to be encoded is repeated in accordance with the aforementioned raster scan scanning order, then the steps C3 to C14 are repeated for this following block selected.

The encoding steps that have just been described above are implemented for all the blocks $B_1, B_2, \ldots, B_u, \ldots, B_S$ to be encoded of the current image $IC_j$ considered.

Particular Configurations of Permutation-Transformation Pairs

Other possible configurations of permutation-transformation pairs will now be mentioned below by way of additional examples.

According to one embodiment, rather than using the set of permutations and transformations presented above, notably in connection with FIGS. 3A to 3C, it is provided that this set be restricted.

Thus, for blocks of size 4×4, for example, various compromises, according to the number of permutation-transformation pairs, are provided below.

For this purpose, a 1+Y mode is determined which defines a number of different permutation-transformation pairs to be used.

For Y=0, the 1+0 mode defines a pair including one transformation and one "identity" permutation $P_0$.

For Y>0, the 1+Y mode defines multiple pairs formed from a combination of a plurality of transformations and a plurality of permutations.

By way of examples:

for Y=1, the 1+1 mode is a mode that defines two possible transformation and permutation pairs, where two different transformations are provided: one pair formed of one "identity" permutation $P_0$ and one DST transformation and another pair formed of one "identity" permutation $P_0$ and one DCT transformation, for Y=2, the 1+2 mode is a mode that defines three possible transformation and permutation pairs, where two different transformations and three different permutations $P_0, P_1, P_2$ are provided so as to constitute the following three permutation-transformation pairs: $P_0$-DST, P1-DST, $P_2$-DCT.

The aforementioned 1+0, 1+1 and 1+2 modes offer various compromises of complexity for reducing the number of transformations to be used, thereby reducing the number of pairs to be tested during the encoding for selecting the best permutation-transformation pair.

Thus in the 1+1 mode, in the course of the selection step C5 represented in FIG. 1, only the DCT and DST transformations need to be compared in accordance with the rate-distortion criterion $J_{m,n}$, since only a single possible permutation is provided.

In the 1+2 mode, in the course of the aforementioned selection step C5, only three rate-distortion criteria need to be compared since there are three permutation-transformation pairs in such a mode.

The storage of the permutations may also be reduced in the case where the number of permutation-transformation pairs is limited.

A set of compromises according to the number of permutation-transformation pairs made available in the encoder CO and according to the size of the blocks is represented below.

The $P_0$+dst mode, i.e. a purely dst approach, is placed in competition with a set of permutation-transformation pairs based on other transformations, such as the DCT, for example.

| Mode | 1 + 1 | | 1 + 2 | | 1 + 3 | | 1 + 4 | | 1 + 8 | | 1 + 16 | |
|---|---|---|---|---|---|---|---|---|---|---|---|---|
| pair | Perm | Transf. | Perm | Transf. | Perm | Transf. | Perm | Transf. | Perm | Transf. | Perm | Transf. |
| 0 | $P_0$ | dst | $P_0$ | dst | $P_1$ | dst | $P_0$ | dst | $P_0$ | dst | $P_0$ | dst |
| 1 | $P_0$ | dct | $P_1$ | dst | $P_{27}$ | dst | $P_2$ | dst | $P_5$ | dst | $P_{11}$ | dst |
| 2 | | | $P_2$ | dct | $P_6$ | dst | $P_1$ | dst | $P_6$ | dst | $P_{12}$ | dst |
| 3 | | | | | | | $P_3$ | dct | $P_7$ | dst | $P_{13}$ | dst |
| 4 | | | | | | | $P_4$ | dct | $P_1$ | dst | $P_{14}$ | dst |
| 5 | | | | | | | | | $P_8$ | dct | $P_{15}$ | dst |
| 6 | | | | | | | | | $P_9$ | dct | $P_{16}$ | dst |
| 7 | | | | | | | | | $P_3$ | dct | $P_{17}$ | dst |
| 8 | | | | | | | | | $P_{10}$ | dct | $P_{18}$ | dst |
| 9 | | | | | | | | | | | $P_{19}$ | dct |
| 10 | | | | | | | | | | | $P_{20}$ | dct |
| 11 | | | | | | | | | | | $P_{21}$ | dct |
| 12 | | | | | | | | | | | $P_{22}$ | dct |
| 13 | | | | | | | | | | | $P_{23}$ | dct |
| 14 | | | | | | | | | | | $P_{24}$ | dct |
| 15 | | | | | | | | | | | $P_{25}$ | dct |
| 16 | | | | | | | | | | | $P_{26}$ | dct |

Number of Permutation-Transformation Pairs for Blocks of Size 4×4

| Mode | 1 + 2 | | 1 + 3 | | 1 + 4 | | 1 + 8 | | 1 + 16 | |
|---|---|---|---|---|---|---|---|---|---|---|
| Pair | Perm | Transf. | Perm | Transf. | Perm | Transf. | Perm | Transf. | Perm | Transf. |
| 0 | $P_0$ | dct | $P_0$ | dct | $P_0$ | dct | $P_0$ | dct | $P_0$ | dct |
| 1 | $P_1$ | dct | $P_3$ | dct | $P_5$ | dct | $P_5$ | dct | $P_9$ | dct |
| 2 | $P_2$ | dct | $P_4$ | dct | $P_6$ | dct | $P_8$ | dct | $P_{10}$ | dct |
| 3 | | | $P_5$ | dct | $P_7$ | dct | $P_9$ | dct | $P_{11}$ | dct |
| 4 | | | | | $P_8$ | dct | $P_{16}$ | dct | $P_{12}$ | dct |
| 5 | | | | | | | $P_{17}$ | dct | $P_{13}$ | dct |
| 6 | | | | | | | $P_{18}$ | dct | $P_{14}$ | dct |
| 7 | | | | | | | $P_{22}$ | dct | $P_{15}$ | dct |
| 8 | | | | | | | $P_{23}$ | dct | $P_{19}$ | dct |
| 9 | | | | | | | | | $P_{20}$ | dct |
| 10 | | | | | | | | | $P_{21}$ | dct |
| 11 | | | | | | | | | $P_{22}$ | dct |
| 12 | | | | | | | | | $P_{24}$ | dct |
| 13 | | | | | | | | | $P_{25}$ | dct |
| 14 | | | | | | | | | $P_{26}$ | dct |
| 15 | | | | | | | | | $P_{27}$ | dct |
| 16 | | | | | | | | | $P_{28}$ | dct |

Number of Permutation-Transformation Pairs for Blocks of Size 8×8

Thus, the encoding of the current block is effectively improved by providing the encoder CO with a plurality of different permutation-transformation pairs.

It is also possible to combine the sizes of the permutation-transformation pairs. For example, a very good compromise in complexity and quality may be achieved by retaining the 1+2 mode for 4×4 blocks and the 1+8 mode for 8×8 blocks. The encoder CO then chooses the best 4×4 transform from among those provided, the same for size 8×8, by minimizing the rate-distortion criterion. The combined choice may be made when choosing the partition of the current block. By way of example, the following combinations are presented below with their associated performances in terms of reducing the transmission rate for a given image quality:

| Combination | 4 × 4 mode | 8 × 8 mode | Performance |
|---|---|---|---|
| 0 | 1 + 2 | $P_0$ + dct | −0.76% |
| 1 | 1 + 4 | $P_0$ + dct | −0.78% |
| 2 | 1 + 8 | $P_0$ + dct | −0.86% |
| 3 | 1 + 16 | $P_0$ + dct | −0.80% |

-continued

| Combination | 4 × 4 mode | 8 × 8 mode | Performance |
|---|---|---|---|
| 4 | 1 + 2 | 1 + 2 | −0.72% |
| 5 | 1 + 2 | 1 + 4 | −0.78% |
| 6 | 1 + 2 | 1 + 8 | −1.09% |
| 7 | 1 + 2 | 1 + 16 | −0.92% |
| 8 | $P_0$ + dst | 1 + 2 | −0.10% |
| 9 | $P_0$ + dst | 1 + 4 | −0.24% |
| 10 | $P_0$ + dst | 1 + 8 | −0.37% |
| 11 | $P_0$ 0 + dst | 1 + 16 | −0.41% |

In particular, a reduction in rate of 1.09% is obtained with the aid of the combination 6 using the 1+2 mode for 4×4 blocks and the 1+8 mode for 8×8 blocks. This reduction in rate is quite significant in video encoding, notably for a technique of low complexity.

In the case where the encoder CO in FIG. 2 does not need to transmit the entirety of the index m*,n* of the criterion $J_{j*,n*}$, increased encoding performances are obtained as represented below:

| 4 × 4 mode | Performance |
|---|---|
| 1 + 2 | −4.36% |
| 1 + 4 | −6.13% |
| 1 + 8 | −8.28% |
| 1 + 16 | −10.35% |

Detailed Description of the Decoding Portion

One embodiment of the method of decoding according to the invention will now be described, in which the method of decoding is implemented in software or hardware by modifications to a decoder initially compliant with the HEVC standard. The method of decoding according to the invention is represented in the form of an algorithm comprising steps D1 to D12 as represented in FIG. 5.

Figure 4:
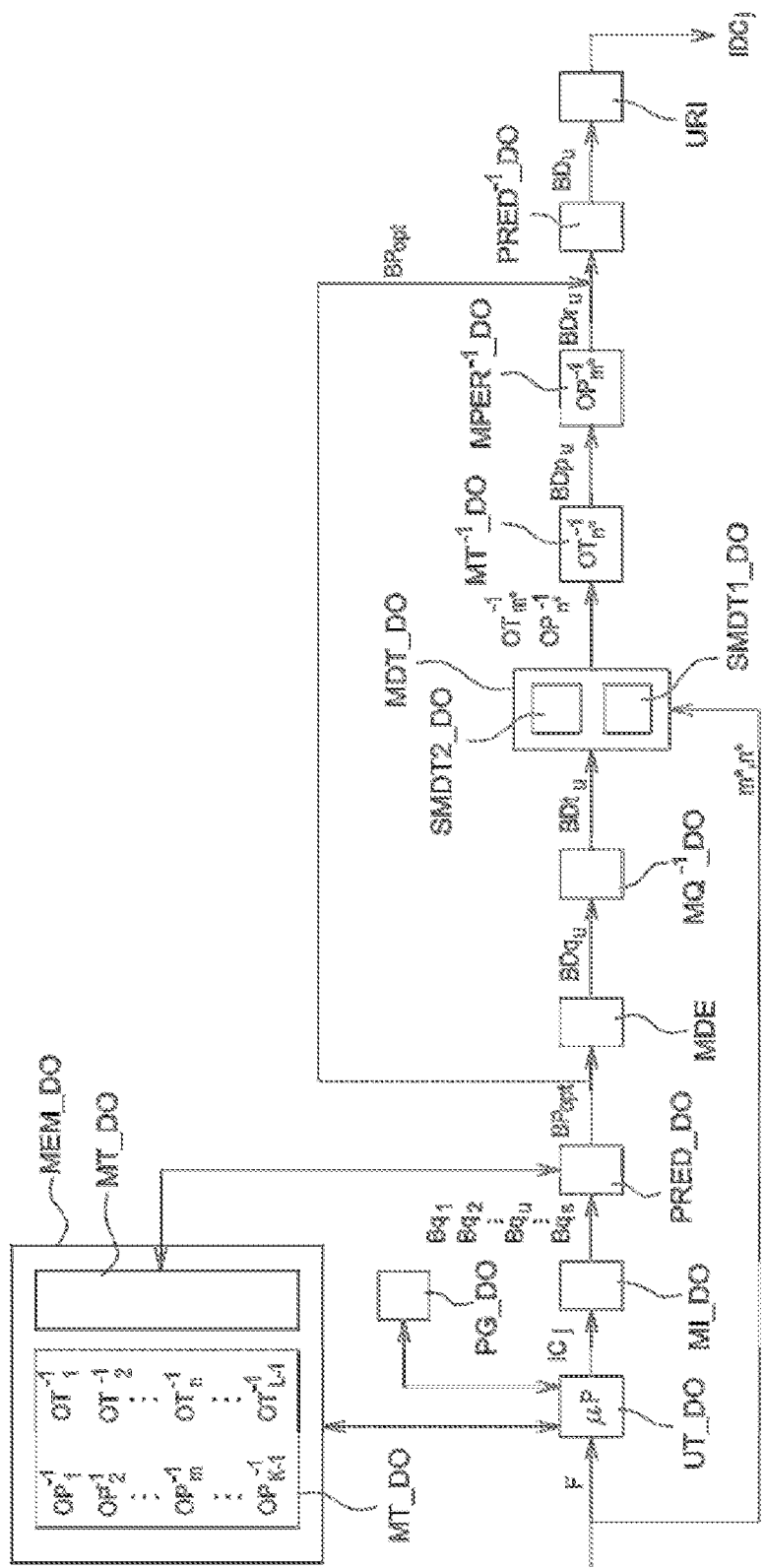
FIG. 4 represents an embodiment of a decoding device according to the invention.

As illustrated in FIG. 4, the decoder DO according to this embodiment of the invention includes a memory MEM_DO including a buffer memory MT_DO, a processing unit UT_DO provided, for example, with a microprocessor μP and controlled by a computer program PG_DO which implements the method of decoding according to the invention. On initialization, the code instructions of the computer program PG_DO are, for example, loaded into a RAM memory, before being executed by the processor of the processing unit UT_DO.

Figure 5:
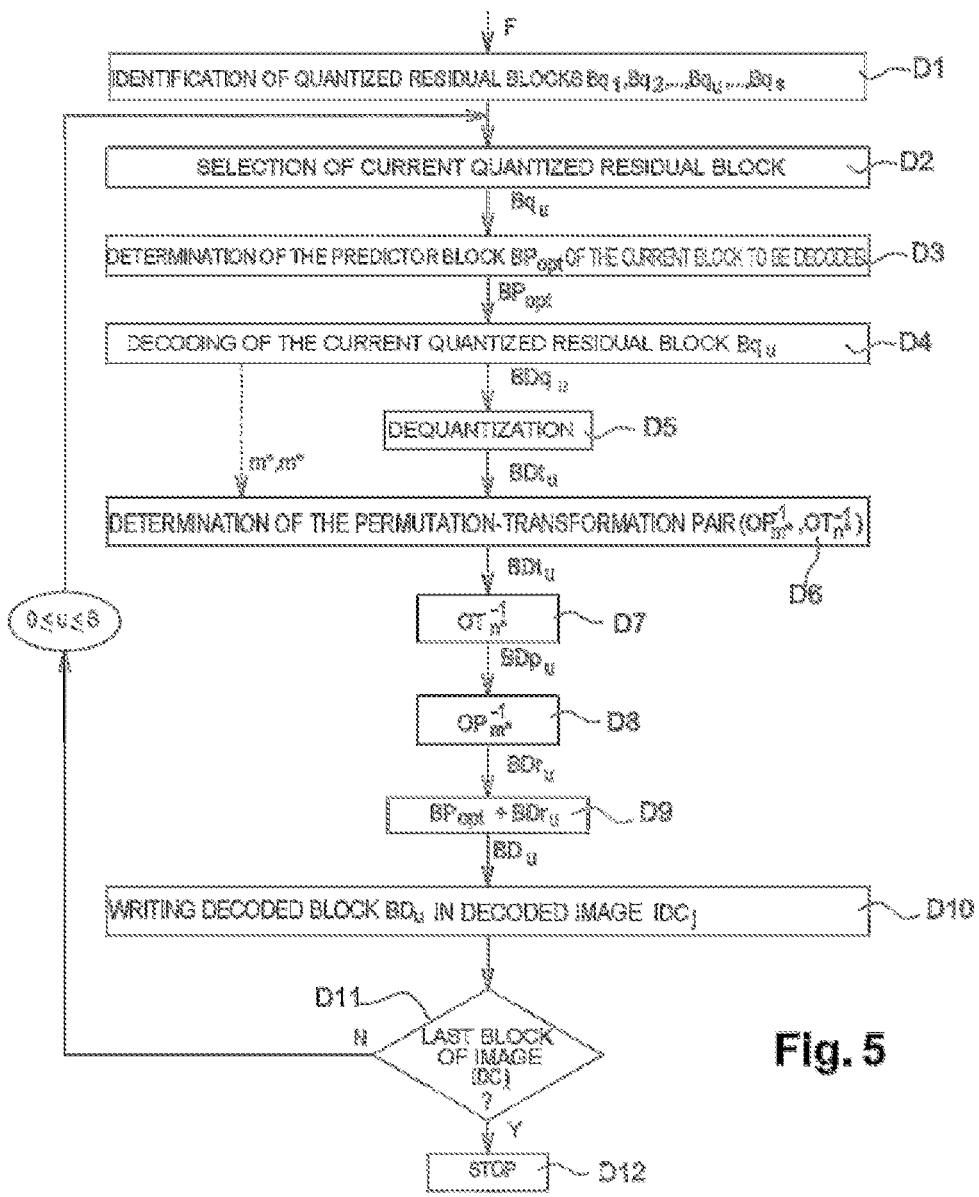
FIG. 5 represents the main steps of the method of decoding according to the invention.

The method of decoding represented in FIG. 5 applies to any current image of a sequence SQ of images to be decoded.

For this purpose, information items representative of the current image $IC_j$ to be decoded are identified in a signal or data stream F received at the decoder, as delivered as the result of the method of encoding in FIG. 1.

With reference to FIG. 5, in the course of a step D1, quantized residues $Bq_1, Bq_2, \ldots, Bq_u, \ldots Bq_S$ (1≤u≤S) are identified in said stream F associated with the blocks $B_1, B_2, \ldots, B_u, \ldots, B_S$ previously encoded in accordance with the aforementioned raster scan scanning, in accordance with the method of encoding in FIG. 1.

Such an identification step is implemented by a stream analysis identification module MI_DO, as represented in FIG. 4, said module being controlled by the microprocessor μP of the processing unit UT_DO.

Said quantized residues $Bq_1, Bq_2, \ldots, Bq_u, \ldots, Bq_S$ are intended to be decoded according to a predetermined scanning order, which is, for example, sequential, i.e. said residues are intended to be decoded one after the other in accordance with the raster scan order in which they have been encoded.

Types of scanning other than that which has just been described above are, of course, possible and depend on the scanning order chosen in the encoding, examples of which have been mentioned above.

Preferably in the invention, the blocks to be decoded are particularly of a size that is a multiple power of 2, e.g. 4×4 and 8×8. However, the invention also applies more generally to blocks of size M×M (M=16, 32 or 64). P×M and M×P blocks are also usable with P and M taking their value in the set 2, 4, 8, 16, 32 and 64.

Each block may itself be further divided into subblocks which are themselves subdivisible.

In the course of a step D2 represented in FIG. 5, the decoder DO in FIG. 4 selects as the current block a first quantized residual block $Bq_u$.

In the course of a step D3 represented in FIG. 5, the prediction of the current block $B_u$ to be decoded is performed by known techniques of intra and/or inter prediction.

For this purpose, the block $B_u$ to be decoded is predicted with respect to at least one predictor block in accordance with a mode of prediction selected from among a plurality of predetermined modes of prediction.

In particular, the mode of prediction selected is directly read in the stream F in the case where the encoder CO in FIG. 2 has signaled this mode to the decoder DO in FIG. 4.

Such a predictor block is, for example, a block of pixels which has already been decoded or not decoded. Such a predictor block is previously stored in the buffer memory MT_DO of the decoder DO as represented in FIG. 4.

At the end of the prediction step D3, an optimal predictor block $BP_{opt}$ compliant with the mode of prediction selected is obtained. The block $BP_{opt}$ is an approximation of the current block $B_u$ to be decoded. The information items relating to this prediction are read in the data stream F. Such information items notably include the type of prediction (inter or intra), the type of partitioning of the current block if the latter has been subdivided, the reference image index and the motion vector used in the case where a mode of inter prediction has been selected. These information items will subsequently be decoded in a conventional way.

Step D3 is implemented by a predictive decoding software module PRED_DO represented in FIG. 4, which module is controlled by the microprocessor μP of the processing unit UT_DO.

In the course of a step D4 represented in FIG. 5, the data of the quantized residual block $Bq_u$ are decoded, for producing a decoded quantized residual block $BDq_u$. In the preferred embodiment, the decoding performed is an arithmetic or Huffman entropy decoding which is known as such. Step D4 then consists in:

reading the symbol or symbols which are associated with said current block to be decoded, associating digital information, such as bits, with the symbol(s) read.

Such an entropy decoding step is implemented by an entropy decoding software module MDE represented in FIG. 4, which module is controlled by the microprocessor μP of the processing unit UT_DO. The entropy decoding module MDE is, for example, of the CABAC type. It may also be a Huffman decoder known as such.

In the course of a step D5 represented in FIG. 5, the quantized residual block $Bq_u$ is dequantized, according to a conventional dequantization operation, which is the inverse operation of the quantization operation performed in step C7 in FIG. 1. A decoded dequantized block $BDt_u$ is then obtained.

Such a dequantization step is performed by an inverse quantization software module $MQ^{-1}\_DO$, as represented in FIG. 4, which is controlled by the microprocessor μP of the processing unit UT_DO.

In the course of a step D6 represented in FIG. 5, a pair of mathematical operations is determined including a transformation operation $OT^{-1}_{n*}$ and a permutation operation $OP^{-1}_{m*}$ the inverse operations of the transformation $OT_{n*}$ and permutation $OP_{m*}$ operations respectively, said pair being compliant with the predetermined criterion $J_{m*,n*}$ retained in the aforementioned selection step C5 in FIG. 1.

Such a step D6 is implemented by a determination software module MDT_DO represented in FIG. 4, which module is controlled by the microprocessor μP of the processing unit UT_DO.

Figure 6A:
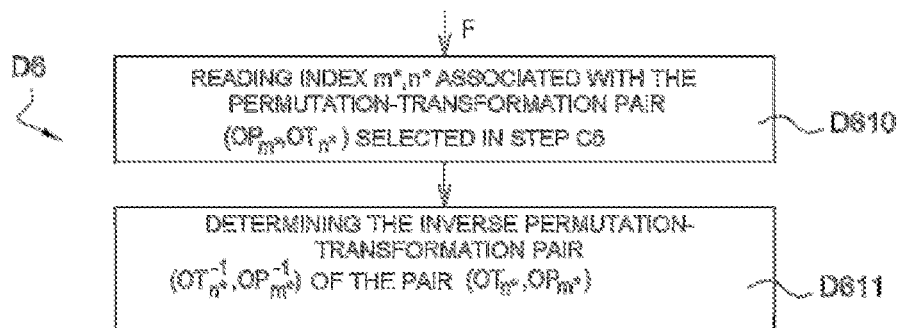
FIG. 6A represents a first embodiment of the step of determining the pair of permutation and transformation operations implemented in the method of decoding in FIG. 5.

As represented in the FIG. 6A, in the case where the index m*,n* of the criterion $J_{m*,n*}$ retained in the aforementioned step C5 has been transmitted in its entirety in the stream F as a result of the encoding step C9 in FIG. 1, the determination step D6 consists in:

in the course of a substep D610 represented in FIG. 6A, reading this index in the data signal F for retrieving the pair of permutation $OP_{m^*}$ and transformation $OT_{n^*}$ operations associated with the index read, in the course of a substep D611 represented in FIG. 6A, determining the inverse permutation $OP^{-1}_{m^*}$ and transformation $OT^{-1}_{n^*}$ operations of the permutation $OP_{m^*}$ and transformation $OT_{n^*}$ operations of the pair associated with the index read.

Such steps are necessary when the decoder DO in FIG. 4 is itself not capable of retrieving the entirety of the index $m^*,n^*$.

The substeps D610 and D611 are implemented by a software submodule SMDT1_DO represented in FIG. 4.

In the course of said step D6, the index $m^*,n^*$ is decoded.

More precisely, the decoder DO reads, for example, a fixed-length binary code for retrieving the value of the permutation-transformation pair associated with the criterion $J_{m^*,n^*}$ and associating the corresponding inverse permutation-inverse transformation therewith.

In the case, for example, as has been described in connection with the aforementioned step C9, where four values of permutation-transformation pairs: 0, 1, 2, 3 are likely to be signaled in the stream F, if the decoder DO reads the code 00, it assigns the value 0 to the permutation-transformation pair which, in the encoding, has been associated with the criterion $J_{m^*,n^*}$, if the decoder DO reads the code 01, it assigns the value 1 to the permutation-transformation pair which, in the encoding, has been associated with the criterion $J_{m^*,n^*}$, if the decoder DO reads the code 10, it assigns the value 2 to the permutation-transformation pair which, in the encoding, has been associated with the criterion $J_{m^*,n^*}$, if the decoder DO reads the code 11, it assigns the value 3 to the permutation-transformation pair which, in the encoding, has been associated with the criterion $J_{m^*,n^*}$.

In a variant which has been described in connection with the aforementioned step C9, the index $m^*,n^*$ intended to be read by the decoder DO is expressed with the aid of a variable-length code.

In the case, for example, as has been described in connection with the aforementioned step C9, where four values of permutation-transformation pairs: 0, 1, 2, 3 are likely to be signaled in the stream F, if the decoder DO reads the code 0, it assigns the value 0 to the permutation-transformation pair which, in the encoding, has been associated with the criterion $J_{m^*,n^*}$, if the decoder DO reads the code 10, it assigns the value 1 to the permutation-transformation pair which, in the encoding, has been associated with the criterion $J_{m^*,n^*}$, if the decoder DO reads the code 110, it assigns the value 2 to the permutation-transformation pair which, in the encoding, has been associated with the criterion $J_{m^*,n^*}$, if the decoder DO reads the code 111, it assigns the value 3 to the permutation-transformation pair which, in the encoding, has been associated with the criterion $J_{m^*,n^*}$.

According to a preferred embodiment described in connection with the aforementioned step C9, the index $m^*,n^*$ intended to be read by the decoder DO includes two indicators:

a flag signaling the first bit of the code associated with the permutation-transformation pair $OP_{m^*}$, $OT_{n^*}$ selected in the encoding, and a complementary syntax element which indicates the less probable permutation-transformation pairs in binary form.

In the case, for example, as has been described in connection with the aforementioned step C9, where four values of permutation-transformation pairs: 0, 1, 2, 3 are likely to be signaled in the stream F, if the decoder DO reads the flag '0', it assigns the value 0 to the permutation-transformation pair which, in the encoding, has been associated with the criterion $J_{m^*,n^*}$, if the decoder DO reads the flag '1' and the binary complement '0', it assigns the value 1 to the permutation-transformation pair which, in the encoding, has been associated with the criterion $J_{m^*,n^*}$, if the decoder DO reads the flag '1' and the binary complement '10', it assigns the value 2 to the permutation-transformation pair which, in the encoding, has been associated with the criterion $J_{m^*,n^*}$, if the decoder DO reads the flag '1' and the binary complement '11', it assigns the value 3 to the permutation-transformation pair which, in the encoding, has been associated with the criterion $J_{m^*,n^*}$.

According to another preferred embodiment described in connection with the aforementioned step C9, the index $m^*,n^*$ intended to be read by the decoder DO consists only of one flag. This other preferred mode is applicable in the case where a single transform, e.g. a DST, is applied in the coding and where two permutation operations $OP_0$ and $OP_1$ are likely to be applied in combination with the DST.

For this purpose, if the decoder DO reads a bit set to '1', it assigns the value of this bit to the permutation-transformation pair $SOP_0$ which, in the encoding, has been associated with the criterion $J_{m^*,n^*}$, if the decoder DO reads a bit set to '0', it assigns the value of this bit to the permutation-transformation pair $SOP_1$ which, in the encoding, has been associated with the criterion $J_{m^*,n^*}$.

In the case where more than two permutation-transformation pairs are likely to be signaled in the stream F, the decoder DO is suitable for reading a fixed- or variable-length code.

According to another possible embodiment described in connection with the aforementioned step C9, the index $m^*,n^*$ is not signaled in the stream F or only a part of the index $m^*,n^*$ is signaled in the stream F.

Figure 6B:
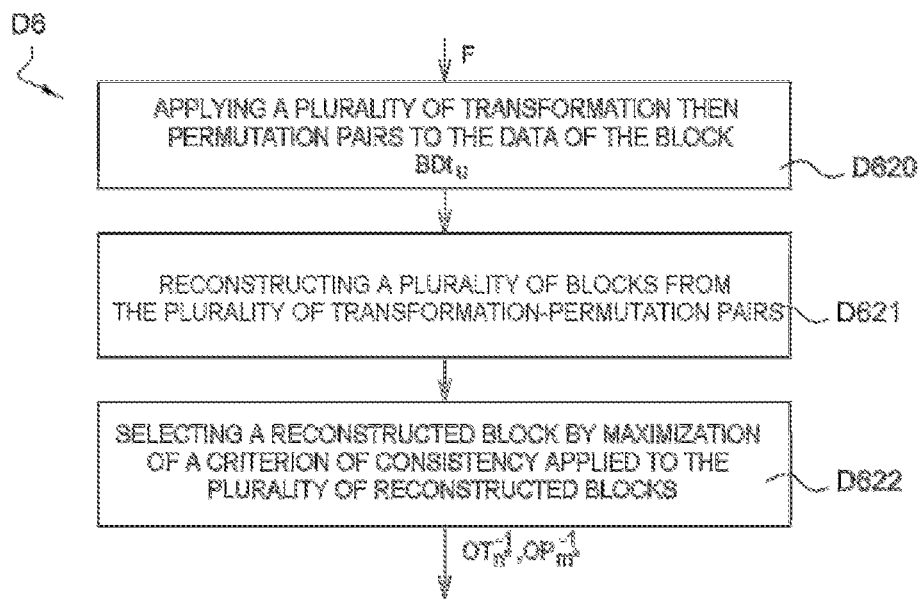
FIG. 6B represents a second embodiment of the step of determining the pair of permutation and transformation operations implemented in the method of decoding in FIG. 5.

As represented in FIG. 6B, in the case where the index $m^*,n^*$ of the criterion $J_{m^*,n^*}$ retained in the aforementioned step C5 has not been transmitted in the stream F as a result of the encoding step C9 in FIG. 1, the determination step D6 consists in:

in the course of a substep D620 represented in FIG. 6B, applying to the data representative of the decoded dequantized block $BDt_u$ a plurality of pairs of mathematical operations including a transformation operation followed by a permutation operation, said transformation and permutation operations being chosen respectively from among a predetermined plurality of transformation operations $OT^{-1}_0$, $OT^{-1}_1$, . . . , $OT^{-1}_n$, . . . , $OT^{-1}_{L-1}$, with $0 \leq n \leq L-1$ and a predetermined plurality of permutation operations $OP^{-1}_0$, $OP^{-1}_1$, . . . , $OP^{-1}_m$, . . . , $OP^{-1}_{K-1}$, with $0 \leq m \leq K-1$, which are available in the memory MT_DO of the decoder DO in FIG. 4, in the course of a substep D621 represented in FIG. 6B, reconstructing a plurality of blocks from said plurality of pairs applied, in the course of a substep D622 represented in FIG. 6B, selecting a reconstructed block from among the plurality of reconstructed blocks, by maximizing a criterion of coherence applied to the plurality of reconstructed blocks.

At the end of the substep D622, the pair of transformation and permutation operations associated with the reconstructed block selected is then identified.

The substeps D620 to D622 are implemented when the decoder DO in FIG. 4 is itself capable of retrieving the entirety of the index m*,n*.

Such substeps are implemented by a software submodule SMDT2_DO represented in FIG. 4.

The aforementioned criterion of coherence consists in measuring the coherence of the pixels of a reconstructed block considered with respect to the neighborhood thereof. The coherence measurement may be a measurement of continuity between the pixels of the reconstructed block and its neighbors, by calculating a sum of the absolute values of the differences.

According to another particular configuration given by way of example and which has been described in connection with the aforementioned step C9:

in the case where a single transform, e.g. a DST, is likely to be applied to the encoding or decoding and where a permutation operation $OP_0$ is applied in combination with the DST, if the decoder DO reads a bit set to '0', it assigns the value of this bit to the permutation-transformation pair $SOP_0$ which, in the encoding, has been associated with the criterion $J_{m^*,n^*}$, in the case where a single transform, e.g. a DST, is likely to be applied and where multiple permutation operations may be applied in combination with the DST, if the decoder DO reads a bit set to '1', it assigns the value of this bit to the plurality of possible permutation-transformation pairs, likely to be applied to the decoding, and itself deduces which is the pair that has actually been signaled, e.g. with the aid of coherence measurements.

The plurality of inverse permutation operations $OP^{-1}_0$, $OP^{-1}_1$, ..., $OP^{-1}_m$, ..., $OP^{-1}_{K-1}$ corresponds to the inverse of the plurality of permutation operations $OP_0$, $OP_1$, ..., $OP_m$, ..., $OP_{K-1}$ examples of which have been cited in the description above of the method of encoding.

The plurality of transformation operations $OT^{-1}_0$, $OT^{-1}_1$, ..., $OT^{-1}_n$, ..., $OT^{-1}_{L-1}$ corresponds to the inverse of the plurality of transformation operations $OT_0$, $OT_1$, ..., $OT_n$, ..., $OT_{L-1}$ examples of which have been cited in the description above of the method of encoding. In the course of a step D7 represented in FIG. 5, the transformation operation $OT^{-1}_{n^*}$, the inverse of the transformation operation $OT_{n^*}$, is applied to the data of the block of dequantized coefficients $BDt_u$, for producing a decoded permuted block $BDp_u$.

Step D7 is implemented by a transformation software module $MT^{-1}$_DO, as represented in FIG. 4, which module is controlled by the microprocessor µP of the processing unit UT_DO.

In the course of a step D8 represented in FIG. 5, the permutation operation $OP^{-1}_{m^*}$, the inverse of the permutation operation $OP_{m^*}$, is applied to the data of the decoded permuted block $BDp_u$, for producing a decoded residual block $BDr_u$.

Step D8 is implemented by a permutation software module $MPER^{-1}$_DO, as represented in FIG. 4, which module is controlled by the microprocessor µP of the processing unit UT_DO.

In the course of a step D9 represented in FIG. 5, the current block $B_u$ is reconstructed by adding the predictor block $BP_{opt}$ obtained in step D3 to the decoded current residual block $BDr_u$.

Said step D9 is implemented by an inverse prediction software module $PRED^{-1}$_DO represented in FIG. 4, which module is controlled by the microprocessor µP of the processing unit UT_DO.

A decoded block $BD_u$ is then obtained and stored in the buffer memory MT_DO in FIG. 4, in order to be used by the decoder DO as a predictor block for a following block to be decoded.

In the course of a step D10 represented in FIG. 5, said decoded block $BD_u$ is written in a current decoded image $IDC_j$. Such a step is implemented by an image reconstruction software module URI as represented in FIG. 4, said module being controlled by the microprocessor µP of the processing unit UT_DO.

In the course of a step D11 represented in FIG. 5, the decoder DO tests whether the current block $BD_u$ which has just been decoded is the last block contained in the stream F.

If such is the case, in the course of a step D12 represented in FIG. 5, the method of decoding is terminated.

If such is not the case, in the course of step D2, the selection is performed of the following residual block to be decoded in accordance with the aforementioned raster scan scanning order.

The decoding steps that have just been described above are implemented for all the blocks $B_1$, $B_2$, ..., $B_u$, ..., $B_S$ to be decoded of the current image $IC_j$ considered.

It goes without saying that the embodiments that have been described above have been given as purely indicative and are in no way restrictive, and that numerous modifications may easily be made by the person skilled in the art without, however, departing from the scope of the invention.

Thus, the method of encoding and/or decoding according to the invention, instead of being applied to current blocks of size 4×4 or 8×8, may also be applied to current blocks having different possible sizes, such as, for example, 16×16 and 32×32.

What is claimed is:

1. A method for decoding a data signal representative of at least one image cut into blocks, wherein the method includes, for a current block to be decoded, the following acts performed by a decoding device:

determining, in said data signal, a residual data block associated with the current block to be decoded, said residual data block having data rows and data columns, determining a permutation-transformation pair comprising a transformation mathematical operation and a permutation mathematical operation to be applied in combination to said residual data block, said transformation mathematical operation and said permutation mathematical operation belonging to respectively at least one transformation operation and a plurality of permutation operations, firstly transforming the data of said residual data block by the determined transformation mathematical operation to produce transformed data, said determined transformation mathematical operation being applied to said data rows and data columns of said residual data block, secondly permuting the transformed data by the determined permutation mathematical operation to produce data transformed then permuted, said determined permutation mathematical operation being an operation of transposing said transformed data, and using said data transformed then permuted to reconstruct said current block by a predictive decoding.

2. The method of decoding as claimed in claim 1, in which the act of determining said pair of mathematical operations implements the following acts:
- reading, in a data signal, information representative of said pair of permutation and transformation operations,
- determining the inverse permutation and transformation operations of the permutation and transformation operations of the pair associated with the information read.

3. The method of decoding as claimed in claim 1, in which the act of determining said permutation-transformation pair comprises:
- applying to said data of said residual data block a plurality of pairs of mathematical operations including a transformation operation followed by a permutation operation, said transformation and permutation operations being chosen from among the at least one transformation operation and the plurality of permutation operations,
- reconstructing a plurality of blocks from said plurality of pairs applied,
- selecting a reconstructed block from among the plurality of reconstructed blocks, by maximizing a criterion of coherence applied to the plurality of reconstructed blocks.

4. The method of decoding as claimed in claim 1, in which said determined transformation operation is a discrete sine transform.

5. The method of decoding as claimed in claim 1, in which said operation of transposing comprises gradually moving said data obtained as a result of applying the transformation operation of the determined pair.

6. The method as claimed in claim 1, wherein the plurality of permutation operations comprises at least one matrix containing only 1s and 0s, and the at least one transformation operation comprises at least one 1-dimension transform of size M×M operating on vectors of size M, M being an integer variable.

7. A device for decoding a data signal representative of at least one image cut into blocks, including, for a current block to be decoded:
- a processor; and
- a non-transitory computer-readable medium comprising instructions stored thereon, which when executed by the processor configure the device for decoding to perform acts comprising:
  - determining, in said data signal, a residual data block associated with the current block to be decoded, said residual data block having data rows and data columns,
  - determining a permutation-transformation pair comprising a transformation mathematical operation and a permutation mathematical operation to be applied in combination to said residual data block, said transformation mathematical operation and said permutation mathematical operation belonging to respectively at least one transformation operation and a plurality of permutation operations,
  - firstly transforming the data of said residual data block by the determined transformation mathematical operation to produce transformed data, said determined transformation mathematical operation being applied to said data rows and data columns of said residual data block,
  - secondly permuting the transformed data by the determined permutation mathematical operation to produce data transformed then permuted, said determined permutation mathematical operation being an operation of transposing said transformed data, and
  - using said data transformed then permuted to reconstruct said current block by a predictive decoding.

8. The device as claimed in claim 6, wherein the plurality of permutation operations comprises at least one matrix containing only 1s and 0s, and the at least one transformation operation comprises at least one 1-dimension transform of size M×M operating on vectors of size M, M being an integer variable.

9. A non-transitory computer-readable medium comprising a computer program stored thereon, which comprises instructions for implementing a method of decoding a data signal representative of at least one image cut into blocks, when said method of decoding is executed on a computer of a decoding device, wherein the instructions configure the decoding device to perform the following acts for a current block to be decoded:
- determining, in said data signal, a residual data block associated with the current block to be decoded, said residual data block having data rows and data columns,
- determining a permutation-transformation pair comprising a transformation mathematical operation and a permutation mathematical operation to be applied in combination to said residual data block, said transformation mathematical operation and said permutation mathematical operation belonging to respectively at least one transformation operation and a plurality of permutation operations,
- firstly transforming the data of said residual data block by the determined transformation mathematical operation to produce transformed data, said determined transformation mathematical operation being applied to said data rows and data columns of said residual data block, and
- secondly permuting the transformed data by the determined permutation mathematical operation to produce data transformed then permuted, said determined permutation mathematical operation being an operation of transposing said transformed data, and
- using said data transformed then permuted to reconstruct said current block by a predictive decoding.

10. The non-transitory computer-readable medium as claimed in claim 9, wherein the plurality of permutation operations comprises at least one matrix containing only 1s and 0s, and the at least one transformation operation comprises at least one 1-dimension transform of size M×M operating on vectors of size M, M being an integer variable.

* * * * *